US009336343B2

(12) United States Patent
Joshi et al.

(10) Patent No.: US 9,336,343 B2
(45) Date of Patent: May 10, 2016

(54) CALCULATING CIRCUIT-LEVEL LEAKAGE USING THREE DIMENSIONAL TECHNOLOGY COMPUTER AIDED DESIGN AND A REDUCED NUMBER OF TRANSISTORS

(71) Applicant: International Business Machines Corporation, Armonk, NY (US)

(72) Inventors: Rajiv V. Joshi, Yorktown Heights, NY (US); Keunwoo Kim, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 14/194,225

(22) Filed: Feb. 28, 2014

(65) Prior Publication Data

US 2015/0247890 A1    Sep. 3, 2015

(51) Int. Cl.
*G06F 17/50* (2006.01)
(52) U.S. Cl.
CPC ........ *G06F 17/5036* (2013.01); *G06F 17/5081* (2013.01); *G06F 2217/06* (2013.01); *G06F 2217/82* (2013.01)

(58) Field of Classification Search
None
See application file for complete search history.

(56) References Cited

U.S. PATENT DOCUMENTS

| | | | |
|---|---|---|---|
| 4,739,252 A | 4/1988 | Malaviya et al. | |
| 5,438,527 A * | 8/1995 | Feldbaumer | H01L 22/20 257/E21.525 |
| 5,557,620 A * | 9/1996 | Miller, Jr. | G01R 31/3004 714/733 |
| 5,742,177 A * | 4/1998 | Kalb, Jr. | G01R 31/3004 257/E21.531 |
| 5,869,977 A * | 2/1999 | Kalb, Jr. | G01R 31/3008 324/537 |
| 5,889,409 A * | 3/1999 | Kalb, Jr. | G01R 31/3008 324/750.3 |
| 6,242,934 B1 * | 6/2001 | Kalb, Jr. | G01R 31/3004 257/E21.531 |
| 6,345,379 B1 * | 2/2002 | Khouja | G06F 17/5022 716/115 |
| 6,812,724 B2 * | 11/2004 | Rao | G01R 31/3008 324/762.03 |
| 6,842,714 B1 * | 1/2005 | Acar | G01R 31/3008 702/136 |
| 6,968,519 B2 * | 11/2005 | Guettaf | G01R 31/2879 716/106 |
| 7,064,570 B2 * | 6/2006 | Buffet | G01R 31/2843 324/762.02 |
| 7,157,928 B2 | 1/2007 | So et al. | |
| 7,352,170 B2 * | 4/2008 | Heaberlin | G01R 31/2853 324/762.02 |
| 7,940,058 B2 | 5/2011 | Newton et al. | |
| 8,159,255 B2 * | 4/2012 | Laisne | G01R 31/3008 324/762.01 |
| 8,178,876 B2 | 5/2012 | Hess et al. | |
| 8,286,111 B2 * | 10/2012 | Chandra | G01K 7/425 716/110 |
| 8,316,339 B2 | 11/2012 | Iyer et al. | |
| 8,667,442 B1 * | 3/2014 | Tian | G06F 17/5036 716/111 |
| 8,726,212 B1 * | 5/2014 | Huang | G06F 17/5036 716/112 |
| 2007/0115006 A1 | 5/2007 | Anude et al. | |
| 2007/0244676 A1 | 10/2007 | Shang et al. | |
| 2011/0270548 A1 * | 11/2011 | Zuo | G01R 31/3008 702/60 |
| 2012/0158346 A1 * | 6/2012 | Sul | G01R 31/3008 702/119 |
| 2012/0216089 A1 * | 8/2012 | Chen | G01R 31/3008 714/727 |
| 2015/0067634 A1 * | 3/2015 | Huilgol | G06F 17/5036 716/136 |

OTHER PUBLICATIONS

Chaudhuri et al., "3D vs. 2D Analysis of FinFET Logic Gates under Process Variations," 2011 IEEE, pp. 435-436.*

(Continued)

*Primary Examiner* — Leigh Garbowski
(74) *Attorney, Agent, or Firm* — Mercedes L. Hobson

(57) ABSTRACT

A method for calculating leakage of a circuit including a plurality of transistors includes simulating a three-dimensional model of the circuit, wherein the simulating accounts for a subset of the plurality of the transistors that includes less than all of the plurality of transistors, and calculating the leakage in accordance with the three-dimensional model.

18 Claims, 5 Drawing Sheets

(56) References Cited

OTHER PUBLICATIONS

Xu et al., "Modeling and Design Analysis of 3D Vertical resistive Memory—A Low Cost Cross-Point Architecture," 19th ASP-DAC, Jan. 20-23, 2014, IEEE, pp. 825-830.*

Zou et al., "A novel CAD framework for substrate modeling," IEEE, no date, 4 pages.*

Afshin Abdollah et al., "Leakage Current Reduction in CMOS VLSI Circuits by Input Vector Control", 2004 IEEE pp. 140-154.

* cited by examiner

US 9,336,343 B2

CALCULATING CIRCUIT-LEVEL LEAKAGE USING THREE DIMENSIONAL TECHNOLOGY COMPUTER AIDED DESIGN AND A REDUCED NUMBER OF TRANSISTORS

FIELD OF THE DISCLOSURE

The present disclosure relates generally to design automation and relates more specifically to technology computer aided design (TCAD).

BACKGROUND OF THE DISCLOSURE

Leakage is one of the biggest conditions limiting increased computer processor performance in modern processors. In semiconductor devices, leakage is a quantum phenomenon in which mobile charge carriers (e.g., electrons or holes) tunnel through an insulating region. Leakage increases exponentially as the thickness of the insulating region decreases. Tunneling leakage can also occur across semiconductor junctions between heavily doped P-type and N-type semiconductors. Other than tunneling via the gate insulator or junctions, carriers can also leak between source and drain terminals of a metal oxide semiconductor (MOS) transistor. Leakage primarily occurs inside transistors, but electrons can also leak between interconnects.

Leakage increases power consumption, and if sufficiently large, can cause complete circuit failure. In fact, increased leakage is a common source of circuit failure resulting from non-catastrophic overstress of a semiconductor device (i.e., when the junction or the gate oxide suffers damage that is permanent, but not sufficient to cause a catastrophic failure). Overstressing the gate oxide can lead to stress-induced leakage current.

Various approaches have been used to simulate and/or measure the leakage current of circuit designs. For instance, three-dimensional (3D) computer technology aided design (TCAD) can be used to accurately model a circuit and simulate the leakage paths therein, and Iddq testing can subsequently be used to measure the leakage. However, although 3D TCAD is highly accurate, this accuracy comes at the expense of time. It takes many hours to generate a complete model of a circuit in 3D TCAD; thus, this approach is not efficient when results are needed quickly.

SUMMARY OF THE DISCLOSURE

A method for calculating leakage of a circuit including a plurality of transistors includes simulating a three-dimensional model of the circuit, wherein the simulating accounts for a subset of the plurality of the transistors that includes less than all of the plurality of transistors, and calculating the leakage in accordance with the three-dimensional model.

Another embodiment of a method for calculating leakage of a cell of a multigate device, wherein the cell comprises a plurality of transistors, includes simulating a model of the circuit using three-dimensional technology computer aided design, wherein the simulating accounts for a subset of the plurality of the transistors that includes less than all of the plurality of transistors, and calculating the leakage in accordance with the model and using a technique that relies on measurement of a supply current of the cell when the cell is in a quiescent state.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

In one embodiment, the invention efficiently calculates circuit-level leakage using three-dimensional (3D) technology computer aided design (TCAD) and a reduced number of transistors. In particular, embodiments of the invention generate a leakage model using 3D TCAD, but rather than generate the model based on the complete set of transistors in the circuit, the model considers only a subset of the transistors. For instance, only the transistors positioned along the leakage paths of the circuit may be considered in the 3D analysis. The 3D TCAD produces a highly accurate leakage model, while the reduction in the number of transistors analyzed greatly speeds the 3D simulation.

This approach may be particularly useful when generating leakage models for static random access memory (SRAM) cells. Stress and doping proximity effects typically require that all transistors in an SRAM cell be simulated in a single structure. As discussed above, this can result in a very time consuming simulation. However, embodiments of the invention are equally applicable to other types of circuits (including, for example, very large scale integrated (VLSI) circuit logic and memories).

Embodiments of the invention perform efficient and accurate 3C TCAD simulation for all leakage paths and operating cell bias conditions. The same 3D simulation structures can also be used in different process and operating conditions (e.g., Vdd or Vcc power supply, temperature, etc.) and for different kinds of cells. The disclosed approach can also be linked to other testing tools to access statistical leakage analyses and predictive leakage analyses in various process conditions.

Figure 1:
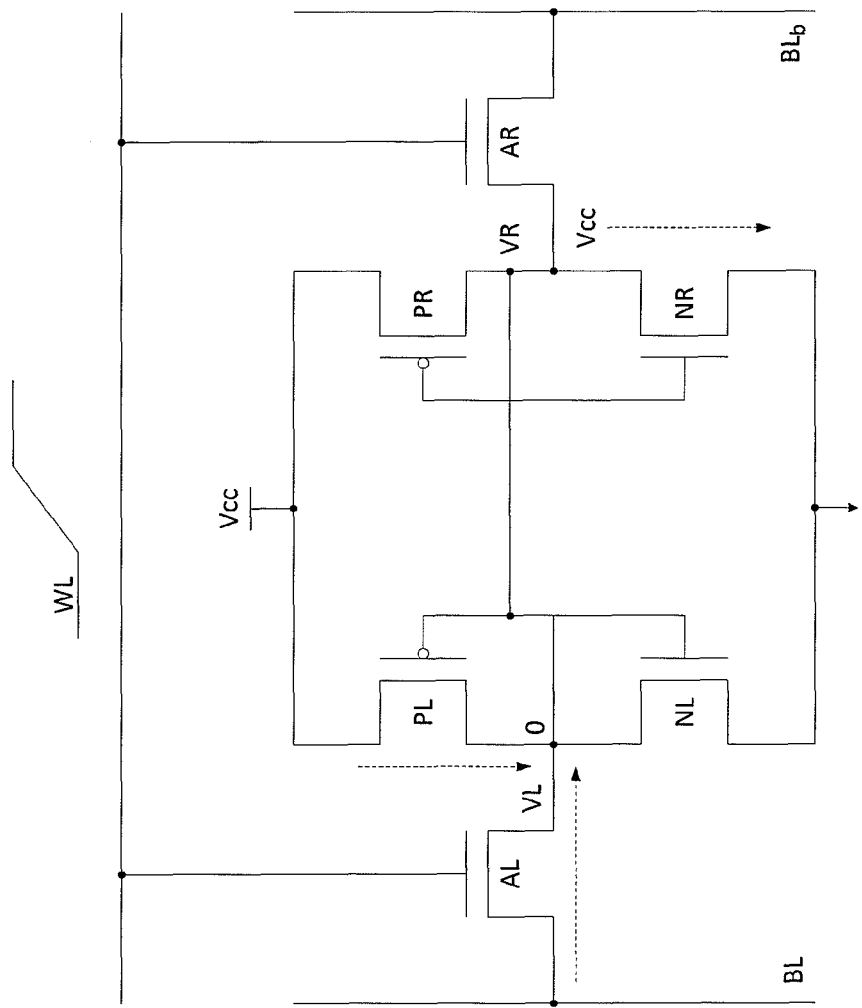
FIG. 1 is a circuit diagram illustrating an exemplary circuit whose leakage may be analyzed using embodiments of the present invention.

FIG. 1 is a circuit diagram illustrating an exemplary circuit 100 whose leakage may be analyzed using embodiments of the present invention. In one embodiment, the circuit is a cell of a multigate or trigate device (e.g., a multigate or trigate field effect transistor, such as a FinFET. The cell may comprise, for example, an SRAM cell of a FinFET.

As illustrated, the circuit 100 comprises a plurality of transistors; in this case, six transistors (labeled as AL, PL, NL, AR, PR, and NR in FIG. 1). It will be appreciated, however, that a circuit may comprise any number of transistors without departing from the scope of the present invention.

As also illustrated, only three of the six transistors are positioned along the leakage paths of the circuit 100. The leakage paths are illustrated by dashed arrows to indicate the direction of the leaking current. Thus, only the transistors AL, PL, and NR are positioned along leakage paths.

Figure 2:
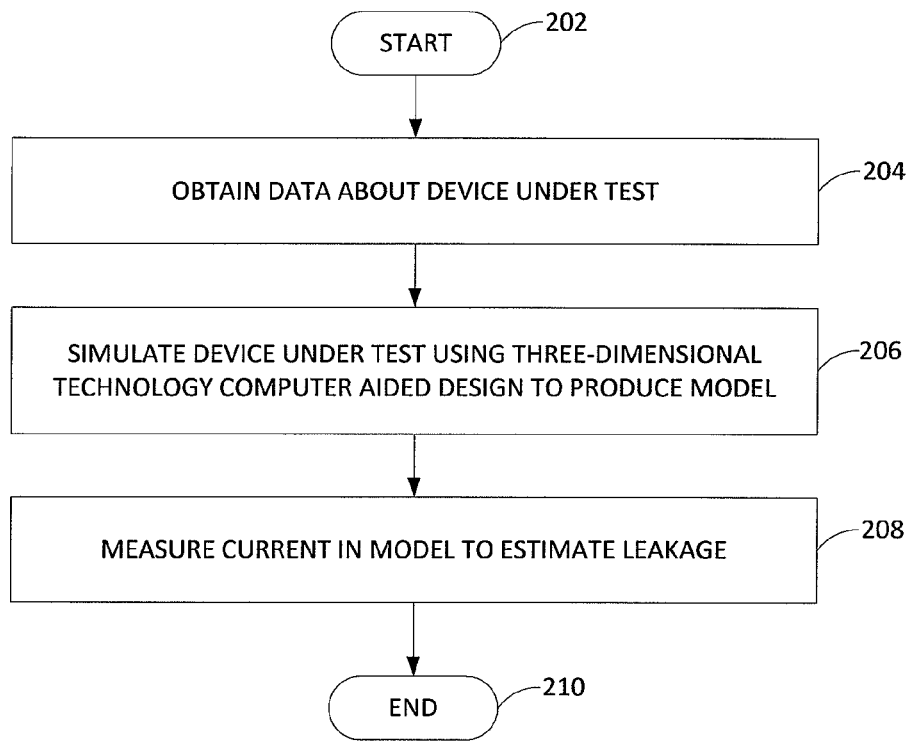
FIG. 2 is a flow diagram illustrating one embodiment of a method for calculating circuit-level leakage.

FIG. 2 is a flow diagram illustrating one embodiment of a method 200 for calculating circuit-level leakage. The method 200 may be performed, for example, by a processor or other device that is tasked with modeling the leakage of a circuit. The description of the method 200 makes reference to elements of the circuit 100 illustrated in FIG. 1. However, it will be appreciated that such references are made for illustrative purposes only and do not limit application of the method 200 to specific circuit configurations.

The method 200 begins in step 202. In step 204, data about the device under test (e.g., the circuit 100) is obtained. This data may include, for example, the number of transistors, the leakage paths, a range supply voltages (Vdd or Vcc), a range of operating temperatures, or the like.

In step 206, the device under test is simulated using three-dimensional (3D) technology computer aided design (TCAD). In one embodiment, the 3D TCAD simulation models only a subset (i.e., less than all) of the transistors contained in the device under test. For instance, if the device under test contains six transistors (e.g., as is the case with the circuit 100), only two or three of the transistors may be modeled in step 206. This reduces the amount of time required to complete the simulation.

In a further embodiment, the subset of the transistors includes transistors that are positioned along leakage paths of the device under test. Thus, for instance, referring again to the circuit 100, the transistors that are modeled in step 206 may include the transistors AL, PL, and/or NR, which as illustrated are positioned along leakage paths of the circuit 100. The result of the simulation is a leakage model that accurately and efficiently models the leakage in the device under test.

In step 208, the current in the model is measured. The sum of the leakage currents that are measured is an estimate of the leakage of the device under test. In one embodiment, measurement of the current is performed using Iddq testing. Iddq testing relies on a measurement of the supply current (Idd) in the device under test's quiescent state (i.e., when the device under test is not switching, and inputs are held at static values). The current consumed in the quiescent state is referred to as the "Iddq." In a quiescent complementary MOS (CMOS) digital circuit that is operating properly, there should be no static current path between power supply and ground, except for a small amount of leakage (e.g., less than ten micro amps of current drawn). Thus, Iddq testing can help detect whether any defects are present in the device under test that cause higher Iddq than some defined threshold. Defects that are detectable by Iddq testing include node bridges, gate oxide shorts, leaky pn junctions (i.e., drain or source to bulk/well leaks), power supply bridges, punchthrough (i.e., drain to source leaks), parasitic leaks, open transistor gates, drains, and sources, and many types of defects that are undetectable using functional tests (e.g., redundant logic, shorts, burn-in failures, and delay faults).

The method 200 ends in step 210.

The direct use of the 3D TCAD structure results in a highly accurate model, while the efficiency of the 3D simulation is greatly improved by considering only a subset of the transistors in the device under test. For instance, a less than approximately two percent discrepancy has been demonstrated in the results obtained using the disclosed invention and those obtained using conventional mix-mode simulation (which simulates the full circuit, including all transistors); however, the disclosed invention is approximately one hundred times faster.

Figure 3:
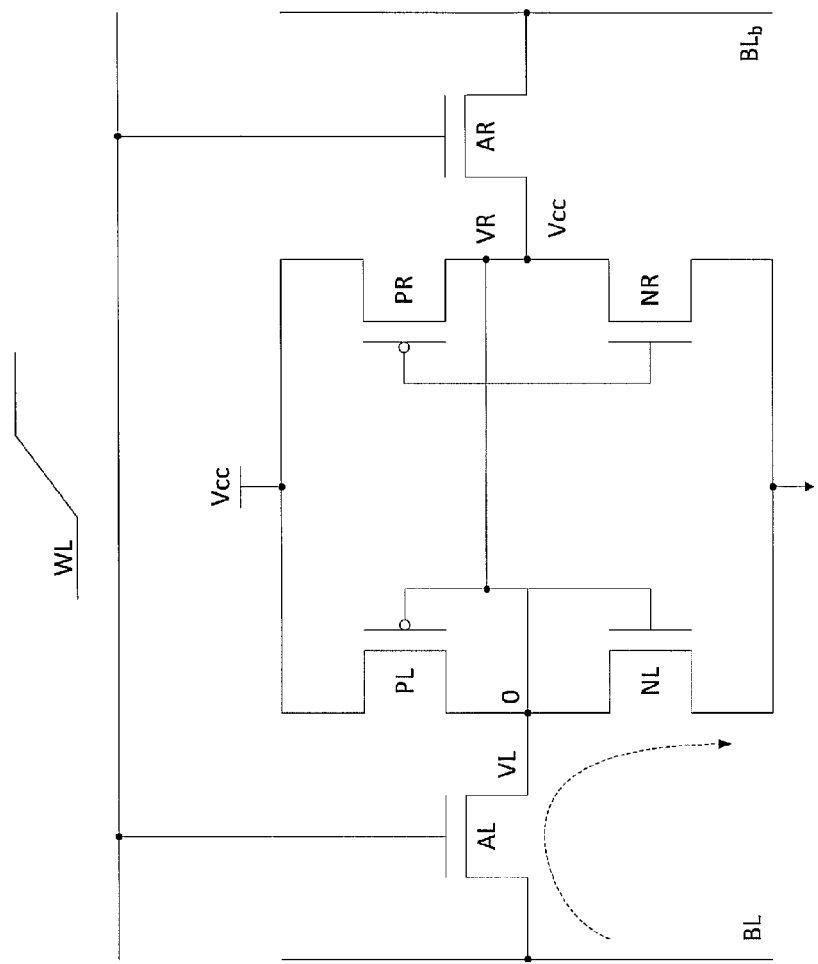
FIG. 3 is a circuit diagram illustrating another exemplary circuit whose leakage may be analyzed using embodiments of the present invention.

FIG. 3 is a circuit diagram illustrating another exemplary circuit 300 whose leakage may be analyzed using embodiments of the present invention. In one embodiment, the circuit is a cell of a multigate or trigate device (e.g., a multigate or trigate field effect transistor, such as a FinFET. The cell may comprise, for example, an SRAM cell of a FinFET.

In particular, FIG. 3 illustrates the path for the read current Iread through the cell. During a read access, the wordline (WL) is activated, and Iread is the current sunk from the bitline (BLb) connected to the node holding "0." When the operating voltage is low, Iread is reduced due to lower gate-drive voltage, which increases read access time. As a result, aggregate leakage current is increased from the unaccessed cells connected to the bitline BLb.

As illustrated, the circuit 300 comprises a plurality of transistors; in this case, six transistors (labeled as AL, PL, NL, AR, PR, and NR in FIG. 3). It will be appreciated, however, that a circuit may comprise any number of transistors without departing from the scope of the present invention.

As also illustrated, only two of the six transistors are positioned along the leakage paths of the circuit 300. The leakage paths are illustrated by dashed arrows to indicate the direction of the leaking current. Thus, only the transistors AL and NL are positioned along leakage paths.

Leakage calculations for the circuit 300 may be performed in accordance with the method 200 described above; when calculating the leakage, however, the wordline is deactivated. The circuit 300 is then simulated using a 3D TCAD simulation that models only a subset of the transistors contained in the device under test (e.g., AL and NL, which as discussed above are positioned along leakage paths of the circuit 300).

Figure 4:
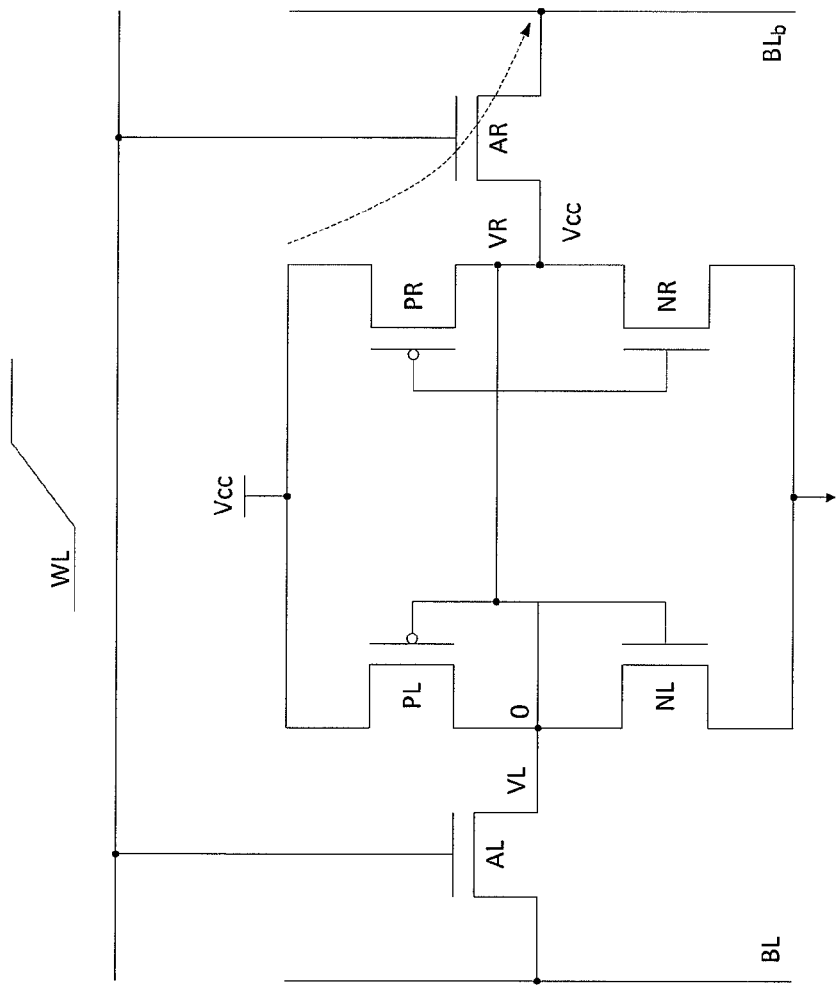
FIG. 4 is a circuit diagram illustrating another exemplary circuit whose leakage may be analyzed using embodiments of the present invention.

FIG. 4 is a circuit diagram illustrating another exemplary circuit 400 whose leakage may be analyzed using embodiments of the present invention. In one embodiment, the circuit is a cell of a multigate or trigate device (e.g., a multigate or trigate field effect transistor, such as a FinFET. The cell may comprise, for example, an SRAM cell of a FinFET. In particular, FIG. 4 illustrates the path for the write current Iwrite through the cell.

As illustrated, the circuit 400 comprises a plurality of transistors; in this case, six transistors (labeled as AL, PL, NL, AR, PR, and NR in FIG. 4). It will be appreciated, however, that a circuit may comprise any number of transistors without departing from the scope of the present invention.

As also illustrated, only two of the six transistors are positioned along the leakage paths of the circuit 400. The leakage paths are illustrated by dashed arrows to indicate the direction of the leaking current. Thus, only the transistors PR and AR are positioned along leakage paths.

Leakage calculations for the circuit 400 may be performed in accordance with the method 200 described above; when calculating the leakage, however, the wordline is deactivated. The circuit 400 is then simulated using a 3D TCAD simulation that models only a subset of the transistors contained in the device under test (e.g., PR and AR, which as discussed above are positioned along leakage paths of the circuit 400).

Figure 5:
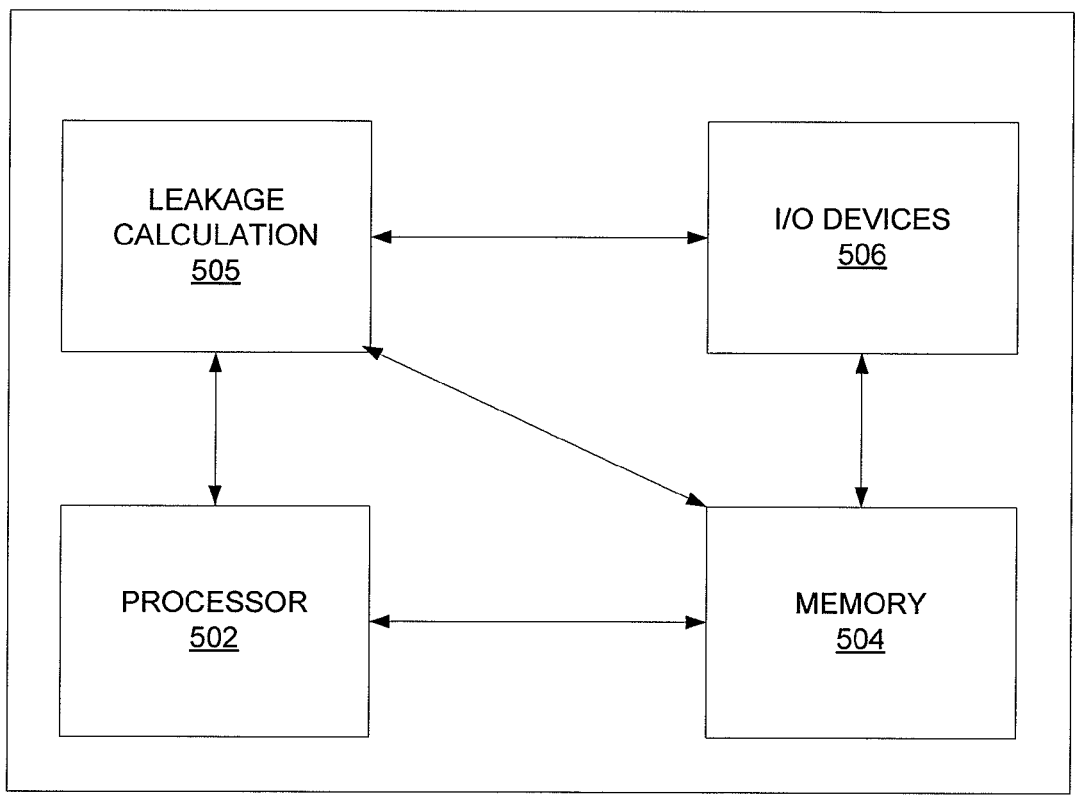
FIG. 5 is a high level block diagram of the present invention implemented using a general purpose computing device.

FIG. 5 is a high level block diagram of the present invention implemented using a general purpose computing device 500. It should be understood that embodiments of the invention can be implemented as a physical device or subsystem that is coupled to a processor through a communication channel. Therefore, in one embodiment, a general purpose computing device 500 comprises a processor 502, a memory 504, a leakage calculation module 505, and various input/output (I/O) devices 506 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., leakage calculation module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the leakage calculation module 505 for calculating circuit-level leakage using 3D TCAD described herein with reference to the preceding Figures can be stored on a tangible or non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for calculating leakage of a circuit comprising a plurality of transistors, the method comprising:
   generating a leakage model of the circuit using a three-dimensional device simulation tool, wherein the only transistors simulated by the leakage model are those of the plurality of transistors that are positioned along a leakage path in the circuit;
   measuring in the leakage model a leakage across each of the transistors simulated by the leakage model; and
   calculating the leakage of the circuit by summing the leakage across each transistor simulated by the leakage model, as measured in the leakage model.

2. The method of claim 1, wherein the measuring is performed using a technique that relies on measurement of a supply current of the circuit when the circuit is in a quiescent state.

3. The method of claim 1, wherein the circuit is a cell of a multigate field effect transistor.

4. The method of claim 1, wherein the circuit is a cell of a trigate field effect transistor.

5. The method of claim 1, wherein the circuit is a static random access memory cell.

6. The method of claim 1, wherein the circuit is a very large scale integrated circuit logic cell.

7. The method of claim 1, wherein the circuit is a very large scale integrated circuit memory cell.

8. The method of claim 1, wherein the generating is performed for a variety of bias conditions in the circuit.

9. The method of claim 1, wherein the generating is performed for a variety of operating conditions in the circuit.

10. The method of claim 9, wherein the variety of operating conditions comprises a range of supply voltages.

11. The method of claim 9, wherein the variety of operating conditions comprises a range of operating temperatures.

12. The method of claim 1, wherein the simulating is performed using three-dimensional technology computer aided design.

13. A method for calculating leakage of a cell of a multigate device, wherein the cell comprises a plurality of transistors, the method comprising:
    generating a leakage model of the cell using three-dimensional technology computer aided design, wherein the only transistors simulated by the leakage model are those of the plurality of transistors that are positioned along a leakage path in the cell;
    measuring a current consumed by the leakage model of the cell when the multigate device is in a quiescent state; and
    calculating the leakage of the cell as a portion of the current consumed that exceeds a defined threshold.

14. The method of claim 13, wherein the cell is a static random access memory cell.

15. The method of claim 13, wherein the cell is a very large scale integrated circuit logic cell.

16. The method of claim 13, wherein the cell is a very large scale integrated circuit memory cell.

17. The method of claim 13, wherein the generating is performed for a range of supply voltages of the cell.

18. The method of claim 13, wherein the generating is performed for a range of temperatures of the cell.

* * * * *